United States Patent [19]

Boyer

[11] 3,781,890

[45] Dec. 25, 1973

[54] RADIO TRANSMITTER RECEIVER INCLUDING LEVEL AND ANTENNA DIRECTION CONTROL CIRCUITRY

[75] Inventor: Marcel Louis Boyer, Chatillon, France

[73] Assignee: C.I.T.-Compagnie Industrielle des Telecommunication, Paris, France

[22] Filed: Nov. 20, 1970

[21] Appl. No.: 91,370

[30] Foreign Application Priority Data

Nov. 20, 1969 France .............................. 6939969

[52] U.S. Cl. ........... 343/100 CS, 325/38 A, 325/55, 325/40

[51] Int. Cl. .............................................. G01s 1/04

[58] Field of Search ...................... 325/38 A, 55, 40; 343/100 CS

[56] References Cited

UNITED STATES PATENTS

| | | | |
|---|---|---|---|
| 3,510,777 | 5/1970 | Gordon | 325/55 |
| 3,535,636 | 10/1970 | Muilwijk | 325/55 |
| 3,428,899 | 2/1969 | Sekimoto | 325/55 |

*Primary Examiner*—Benjamin A. Borchelt
*Assistant Examiner*—Denis H. McCabe
*Attorney*—Craig, Antonelli, Stewart & Hill

[57] ABSTRACT

The invention concerns the field of point-to-point communications in a network of stations equipped for selective calling. It concerns a coding system partially of the numerical types, partially of the analogical type, combined with a device for enabling maximum output at the transmission level. The main applications are in mobile communications, in particular, between airplanes.

18 Claims, 8 Drawing Figures

INVENTOR

MARCEL LOUIS BOYER

BY Craig, Antonelli, Stewart & Hill

ATTORNEYS

FIG. 6b

| | $C_5$ | | $C_6$ | | $C_7$ | | $C_8$ | | $C_9$ | |
|---|---|---|---|---|---|---|---|---|---|---|
| | A | | B | | A | | B | | A | |
| | R | E | R | E | R | E | R | E | R | E |
| $L_1$ | $a_3$ | $a_3$ | $a'_2$ | $a'_2$ | $a_3$ | $a_3$ | $a'_2$ | $a'_2$ | $a_3$ | $a_3$ |
| $L_2$ | $a'_2$ | $a_3$ | $a_3$ | $a'_2$ | $a'_2$ | $a_3$ | $a_3$ | $a'_2$ | $a'_2$ | $a_3$ |
| $L_3$ | — | — | — | — | — | — | — | — | — | — |
| $L_4$ | $Z+a_3$ | $Z+a'_2$ | $Z+a'_2$ | $Z+a_3$ | $Z+a_3$ | $Z+a'_2$ | $Z+a'_2$ | $Z+a_3$ | $Z+a_3$ | $Z+a'_2$ |
| $L_5$ | $b_e$ | $b_e$ | $b_e$ | $b_e$ | $b_e$ | $b_e$ | $b_e$ | $b_e$ | $b_e$ | $b_e$ |
| $L_6$ | l | l | l | l | l | l | l | l | l | l |
| $L_7$ | — | — | — | — | — | — | — | — | — | — |
| $L_8$ | (1) | | (1) | | (0) | | (0) | | (0) | |
| $L_9$ | | $F_1$ | | $F_1$ | | $F_1$ | | $F_1$ | | $F_1$ |
| $L_{10}$ | // | | $F_1$ | | $F_1$ | | $F_1$ | | $F_1$ | |
| $L_{11}$ | | $-0$ $P_A-20$ | | $-10$ $P_B-10$ | | $-10$ $P_A-20$ | | $-0$ $P_A-30$ | | $-0$ $P_B-20$ |

RADIO TRANSMITTER RECEIVER INCLUDING LEVEL AND ANTENNA DIRECTION CONTROL CIRCUITRY

The present invention concerns radio transmitter-receivers, and is particularly, but not exclusively, concerned with transmitter-receivers for point to point communications in a network of stations with selective calling. The invention provides a coding system which is partly digital and partly analogue in combination with an arrangement for optimizing the transmission level. The invention is particularly suitable for use in mobile radio transmitter-receiver stations, more especially as fitted to aircraft.

In communications using selective calling by means of pulse trains, in order to increase the speed at which a communication is established, it is advantageous that the transmission of the selective calling code lasts as short a time as possible. For this it is necessary to have as short a code as possible. Moreover, it is desirable that the transmission level in each of a pair of communications stations be adjusted to a value as low as possible whilst still ensuring adequate intelligibility, since a higher transmission level unnecessarily covers a greater area than that required for the communication, and may thus interfere with other communications which, for a lower transmission level, would not be disturbed. Also, an unnecessarily elevated transmission level increases the risk of radio location of the transmitters, which may be disadvantageous in certain applications. Transmission at an unnecessarily high level may also be disadvantageous where the energy-reserve of the transmitter-receiver is limited, as may be the case in certain mobile applications.

The present invention is intended to simultaneously provide a means of shortening the selective calling codes and means for adjusting the transmission levels in the communication to the lowest possible values commensurate with adequate quality of communication.

In our co-pending application, Ser. No. 78,100 filed Oct. 5, 1970, now patent no. 3,732,496, hereby inserted by way of reference, there is described a radio transmitter-receiver including a control arrangement for adjusting its level of transmission to another transmitter-receiver in accordance with a level signal received from that other transmitter-receiver and indicative of the level at which the transmission is received. The transmitter-receiver also includes a signalling arrangement for transmitting to another or the other transmitter-receiver a level signal significant of the level at which it receives a transmission from that other transmitter-receiver.

Each level signal comprises a selected one of a set of signal frequencies each significant of a pre-selected range of reception levels. Between the lowest possible reception level commensurate with satisfactory intelligibility and a saturation level, the reception level is situated in one of a number of ranges defined by thresholds increasing with the reception level. The highest thereshold is thus the lower limit of the highest reception level range. In dependence on the highest threshold exceeded by the instantaneous reception level, the transmitter-receiver concerned transmits the corresponding signal frequency, situated at one side of the vocal frequency band, for example, in the band 200 to 300 Hertz, or in the band 2900 to 3000 Hertz. The associated transmitter-receiver decodes the signal and carries out a corresponding adjustment of its transmission level with the intention of providing, in the first transmitter-receiver, a reception level in the lowest possible range. If a first stage of regulation does not give a satisfactory result, a new signal frequency is transmitted, bringing about a further adjustment in the transmission level, this process continuing until both transmitter-receivers have a reception level in the lowest possible band. This situation is signalled by the transmission of a particular signalling frequency by both transmitter-receivers.

At the beginning of the regulation process, both transmitter-receivers transmit at their maximal levels. If, during a regulation process, one of the transmitter-receivers at a level lower than the minimum acceptable level, the other transmitter-receiver re-Adopts its maximal transmission level and a new regulation process begins. re-adopts In the arrangements described in the above-mentioned patent application, precautions are taken that this situation arises rarely, so as to obtain an optimal regulation as rapidly as possible. Various arrangements are provided to suppress untimely operation of the system in response to interference signals.

The present invention provides a different solution to the task of regulating transmission levels within a communication, adapted to selective calling.

In accordance with the present invention, a radio transmitter-receiver includes filter circuitry defining an overall frequency range, a reduced frequency range within the overall range, and $k + 1$ discrete frequency bands of substantially equal widths, lying within the overall frequency range and comprising $k$ individual frequency bands and a common frequency band.

The transmitter-receiver suitably includes coder circuitry for providing a pulsed code of $n$ digits for transmission in one of the $k$ individual bands, whereby a total of $2^n k$ pulsed codes are available.

The transmitter-receiver may be arranged for use with an omnidirectinal aerial and a plurality of directional aerials, suitably including aerial selector switching circuitry associated with circuitry for transmitting in the common frequency band a respective code significant of each aerial.

The transmitter-receiver suitably comprises respective first to fourth filter circuits arranged to separate the overall frequency range, an individual frequency band, the common frequency band, and the narrow frequency band, a pair of identical demodulators, a comparator circuit connected to compare the demodulator outputs, and switching circuitry for selectively connecting inputs of selected pairs of filter circuits to the output of a receiver section of the transmitter-receiver and outputs of the selected filter circuit pairs to inputs of the demodulators, the comparator circuit output providing an indication of the reception level in the receiver section.

The division of the overall frequency range into discrete frequency bands is used both to provide relatively short selective call codes and to provide an indication of the received level by means of a differential comparison between the levels in a relatively narrow band and a wider band.

In an embodiment provided with directional aerials as well as an omnidirectional aerial, the invention provides for a combination of optimisation of the transmission level with the choice of the most appropriate directive aerials for transmission and reception. This latter reduces the amount of space used for communication to a minimum and provides the possibility of multiple use of a given carrier for several communications without interference between them.

The invention will now be described in more detail, by way of example only, with reference to the accompanying diagrammatic drawings in which.

Figure 6A:
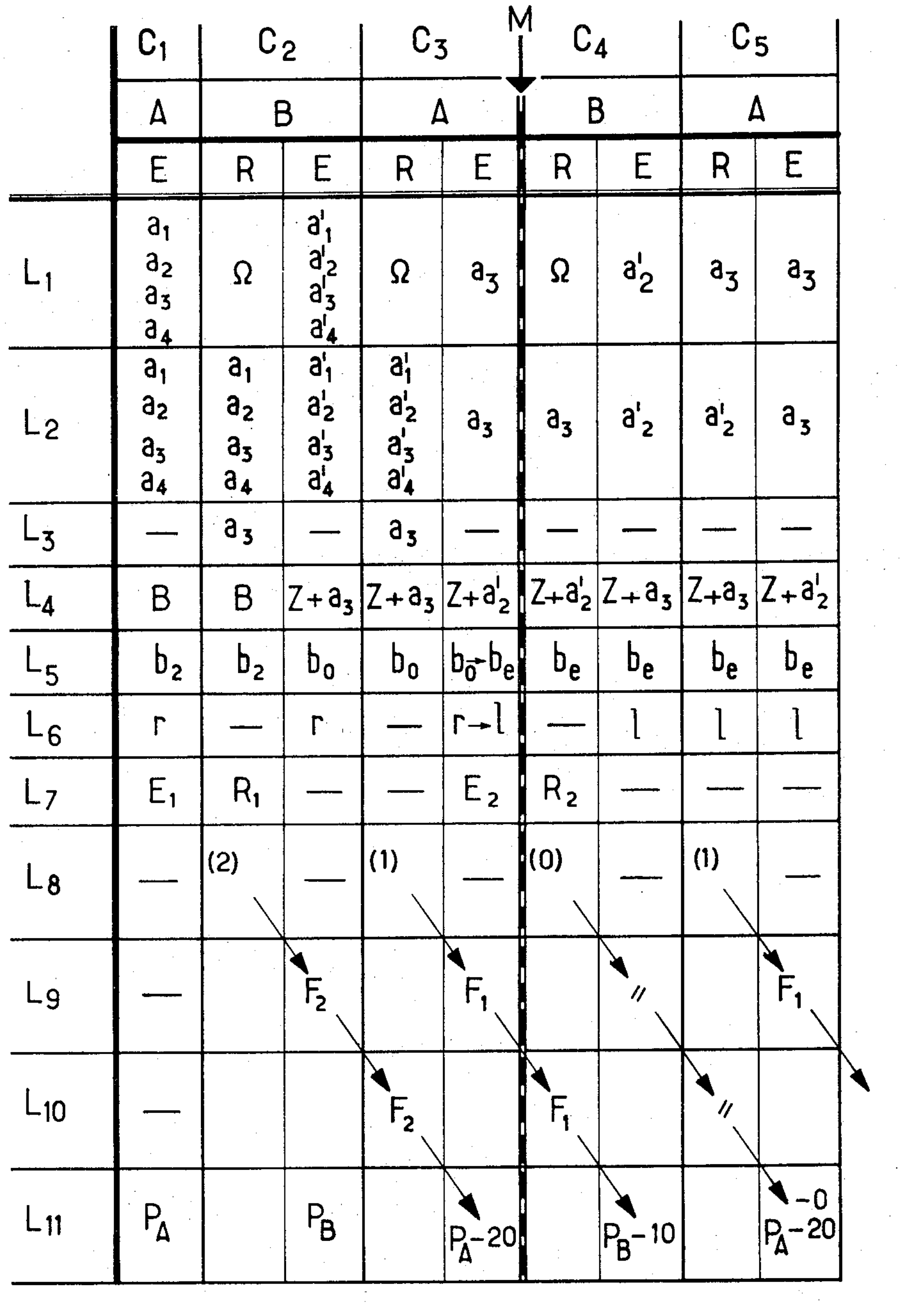
Figure 7:
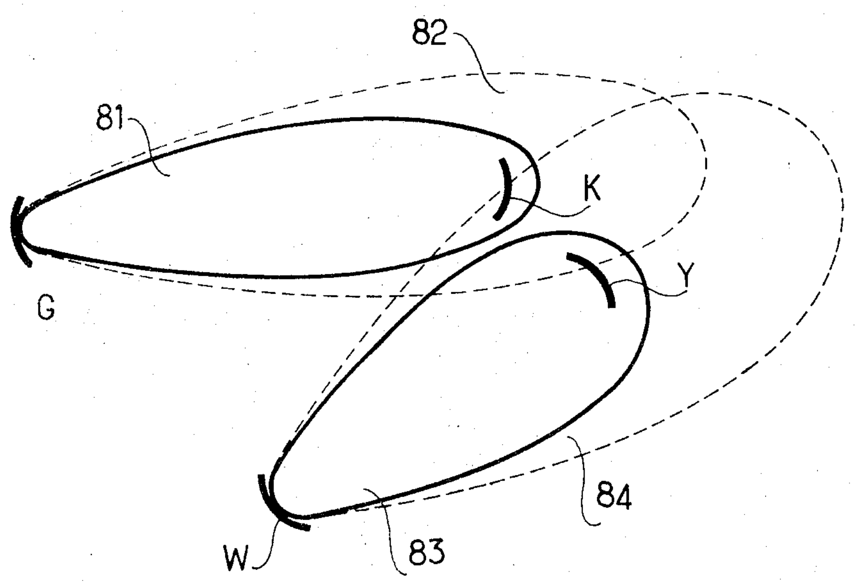

FIG. 6a and 6b, in combination, illustrate a process of selective calling and transmission level regulation; and FIG. 7 diagrammatically illustrates two radio communications.

Figure 1:
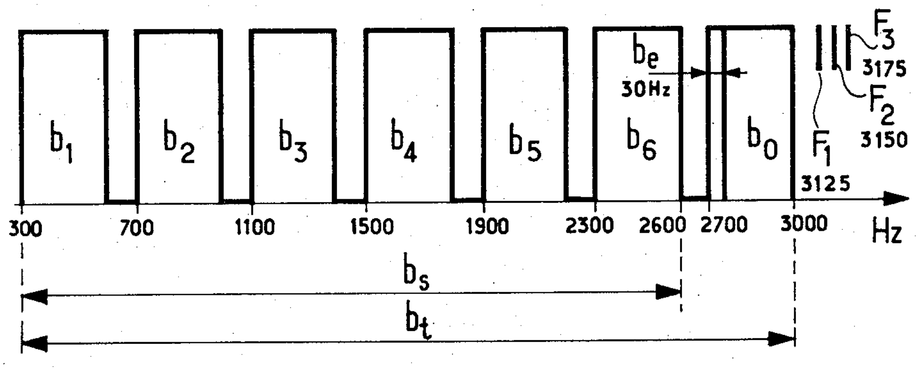
FIG. 1 shows the division of an overall frequency range into discrete frequency bands.

Referring to FIG. 1, an overall frequency range $b_t$ extends from 300 to 3000 Hertz. Within this overall frequency range $b_t$, a reduced frequency range $b_s$ serves for the transmission of information. In the case of communication by voice, this range $b_s$ is the band of vocal frequencies transmitted. It extends from 300 to 2600 Hertz.

The overall frequency range is divided into seven discrete frequency bands of substantially equal width. These discrete frequency bands comprise six individual frequency bands $b_1$ to $b_6$ and a common frequency band $b_0$. The frequency limits of these seven discrete frequency bands are as follows:

$b_1$ : 300 — 600 Hz $b_2$ : 700 — 1000 Hz $b_3$ : 1100 — 1400 Hz $b_4$ : 1500 — 1800 Hz $b_5$ : 1900 — 2200 Hz $b_6$ : 2300 — 2600 Hz $b_0$ : 2700 — 3000 Hz

The individual frequency bands will be indicated by the general reference $b_i$, where $i$ takes the successive values 1 to 6, and are used for the transmission of a selective calling code by a radio transmitter-receiver initiating a communication. The code appropriate to the station being called is transmitted in one only of these bands $b_i$.

In order to avoid a code transmitted in one band being picked up in another band by cross-modulation, which is particularly dangerous with bands $b_1$ and $b_2$, it is advantageous to invert the polarity of the calling code signals from one individual band to the next. The calling codes are transmitted in the form of pulses, with a parity bit, and if a code from band $b_i$ is picked up in one of the neighboring bands, the parity is inverted because of the inversion of all polarities, and the code is not decoded.

The common band $b_0$ is used for the transmission of various codes during the setting up of a communication and during the subsequent conversation, as will become clear from the following. Within this common band $b_0$, a narrow band $b_e$ is defined, having its lower limit coincident with that of the band $b_0$ at a frequency of 2700 Hertz. The width of this band $b_e$ is 30 Hertz, so that its upper limit is situated at a frequency of 2730 Hertz. This narrow band is used in a differential comparison process to be described in more detail later.

Above the overall frequency range $b_t$, an auxiliary frequency range includes three signalling frequencies $F_1$, $F_2$, and $F_3$, with respective values of 3125, 3150, and 3175 Hertz. These signalling frequencies serve for the indication of a reception level, as will be clear from the following.

The radio transmitter-receiver includes filter circuitry defining all these frequency ranges, that is to say the overall frequency range $b_t$, the reduced frequency range $b_s$, the six individual frequency bands $b_i$, and the common frequency band $b_0$. Further filter circuitry is provided to define the narrow frequency band $b_e$. It will be appreciated that the numerical values given above for these frequency ranges are given purely by way of example.

Figure 2:
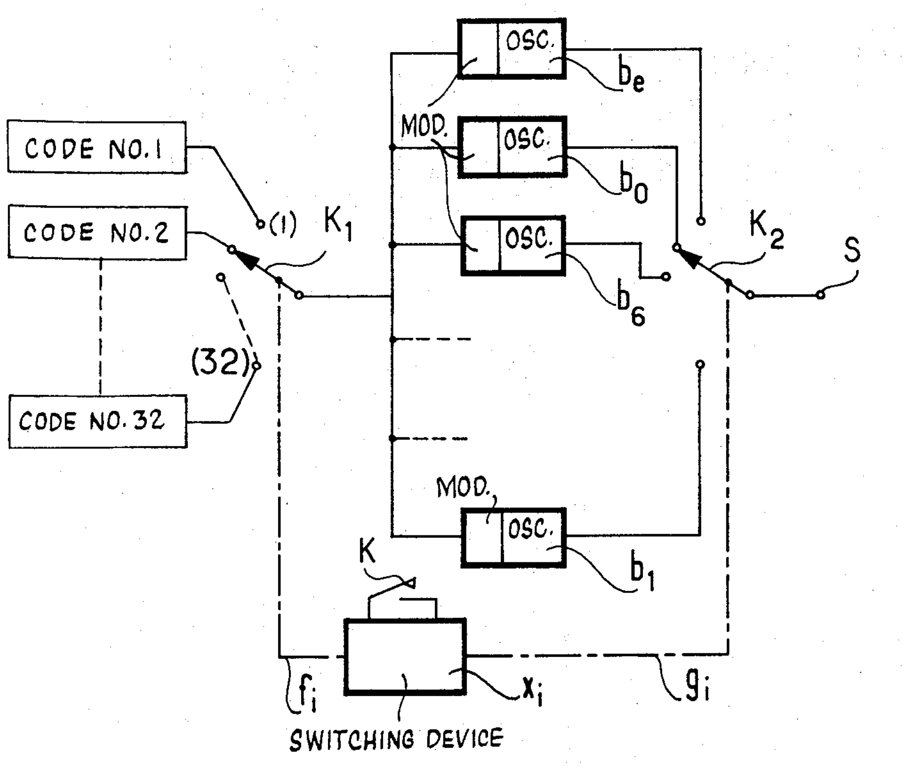
FIG. 2 is a block diagram of a coding arrangement.

Referring now to FIG. 2, apparatus for providing a selective calling code is shown, by way of example in a system including 192 transmitter-receivers, which will be hereinafter referred to briefly as subscribers.

A simple pulsed code for selective calling would need to comprise eight bits, since seven bits would cover only 128 subscribers. In addition, each code might require a synchronizing pulse and a parity pulse, raising the total number to ten.

This number of pulses in each code can be reduced with advantage by including in the characterization of each code one of the individual frequency bands $b_i$ in which it is transmitted. In the present example with six bands $b_i$, the number of bits required in each code is reduced to five. A five bit coded pulse provides thirty-two combinations on each of six bands, that is to say, a total of 192 combinations, one for each subscriber. With this arrangement the duration of transmission of the selective calling code is reduced, with attendant advantages.

The selective calling code $X_i$ of a subscriber is generated in an element carrying the same reference $X_i$ by operation of a key K. This results firstly, over a line $f_i$ in the positioning of a first switching element $K_1$ in one of thirty-two possible positions, each providing a pulsed code of five bits. These codes may be indicated symbolically by the references (1) . . . (32). Over a further line $g_i$, a switching element $K_2$ is set in one of six positions corresponding to the six individual bands $b_i$. Two further positions of switching element $K_2$ correspond to the bands $b_0$ and $b_e$,1dspectively.

Switching element $K_1$ is connected to the inputs of each of eight oscillator-modulator circuit units bearing the references $b_1$ . . . $b_6$,$b_0$, $b_e$, each providing a sub-carrier in the frequency band corresponding to its reference. A selected one of these sub-carriers is applied to the switching element $K_2$ to an output terminal S. Thus at terminal S appears one of the 192 selective calling codes, being that significant of the station to be contacted.

It will be appreciated that the switching elements $K_1$ and $K_2$ will be realized by rapid-acting electronic circuitry which need not be described in detail at this point as they form no part of the present invention and will be readily realizable by those skilled in the art.

Figure 3:
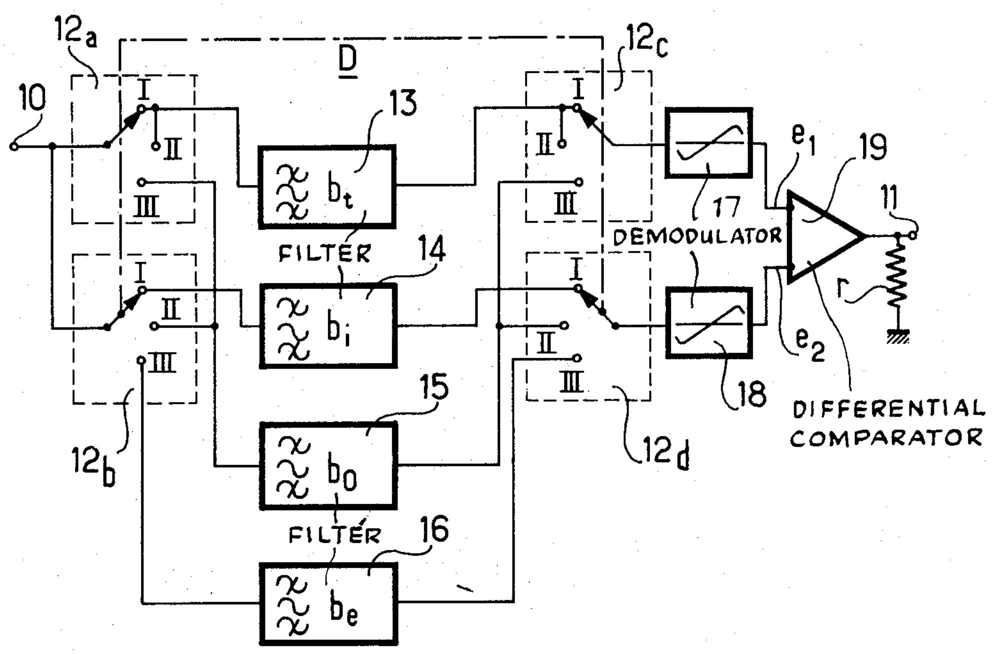
FIG. 3 is a block diagram of circuitry for providing an indication of a received level.

Referring to FIG. 3, circuitry indicated generally by D serves for providing an indication of a reception level in the transmitter-receiver. An input terminal 10 of the circuitry D is connected to receive the demodulated vocal frequency band from the receiver section of the transmitter-receiver. Switching elements 12$_a$ and 12$_b$ consist of two sections of a four-pole three-position switch. A moving contact of each switch section 12$_a$ and 12$_b$ is connected to the input terminal 10. Each section has three fixed contacts referenced I, II, and III.

The circuitry includes four filters 13, 14, 15, and 16, with passbands equal respectively to the frequency ranges $b_t$, $b_0$, and $b_e$.

Two further sections 12$_c$ and 12$_d$ of the four-pole three-position switch each have three fixed contacts referenced I, II, and III, and respective moving contacts connected to the inputs of respective demodulators 17 and 18. In the present example, it is assumed that the radio communication is carried out by frequency modulation, and the demodulators 17 and 18 have been shown as frequency discriminators. Outputs of the two discriminators 17 and 18 are connected to respective inputs $e_1$ and $e_2$ of a differential comparator circuit 19, preferably in the form of a differential amplifier with an output terminal 11 connected to earth or a point at effective earth potential through a resistance $r$. The amplifier 19 includes a time constant circuit with time constants between about half a second and some few seconds, so as to avoid the circuitry responding to brief interference signals.

The moving contacts of the four switch sections 12$_a$ to 12$_d$ operate in synchronism, and the fixed contacts of each section are connected as follows:

12$_a$ I Input of filter 13
II Input of filter 13
III Input of filter 15
12$_b$ I Input of filter 14
II Input of filter 15
III Input of filter 16
12$_c$ I Output of filter 13
II Output of filter 13
III Output of filter 15
12$_d$ I Output of filter 14
II Output of filter 15
III Output of filter 16

Thus in position I of the switch, filter 13 is connected in series with discriminator 17 between terminals 10 and 11, and filter 14 is connected in series with discriminator 18 between terminals 10 and 11. In position II filter 13 is in series with discriminator 17 and filter 15 in series with discriminator 18 between terminals 10 and 11. In position III, filter 15 is in series with discriminator 17 and filter 16 in series with discriminator 18 between terminals 10 and 11.

The differential comparator 19 provides, in the various positions of the switch, the following comparisons:

In position I, a comparison between a code signal in band $b_t$ and the overall signal, including the noise component, in the band $b_t$;

In position II, a comparison between a code signal in band $b_0$ and the overall signal in band $b_t$;

In position III, a comparison between a code signal in band $b_e$ and the overall signal in band $b_0$.

As is well known, the bandwidth necessary for the transmission of a pulsed code is proportional to the speed at which the code is transmitted. In the first two positions I and II of the switch, the codes are transmitted in a relatively wide band, the bandwidths of bands $b_t$ and $b_0$ being both 300 Hertz, to provide high-speed coding. This permits the rapid transmission of a selective calling code for as rapid as possible an establishment of communication.

In the third switch position III the code is transmitted at relatively low speed in the much narrower band $b_e$ whose bandwidth is only 30 Hertz.

A homothetic relationship exists between the overall frequency range, the individual frequency band and the narrow frequency band, since the ratio of the overall frequency range to the width of the individual frequency band is approximately 10:1, as is that of the width of the individual band to that of the narrow band.

Once the communication has been established by the rapid coding, the rest of the regulation process and the maintenance of regulation can proceed at this slower speed provided in the narrow band.

Figure 4:
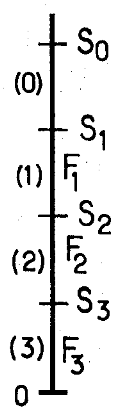
FIG. 4 shows the arrangement of a number of thresholds associated with the circuitry of FIG. 3.

FIG. 4 shows the relationship between the voltages appearing at the output terminal 11 of the circuitry D and the corresponding reception levels in the receiver section of the transmitter-receiver.

Between a substantially zero value and a first and relatively low threshold $S_3$, the difference between the overall signal, including the noise component, and the signal itself is weak. This corresponds to a strong signal, falling in the reception level range indicated (3) in FIG. 4. When the reception level in a transmitter-receiver is situated in this range, the signalling frequency $F_3$ is transmitted to the cooperating transmitter-receiver.

For a voltage lying between thresholds $S_1$ and $S_0$, in a reception level range indicated (0), the reception level is at its optimum value. In this range the noise is strong in relation to the signal, but not unacceptably so. In this optimum range, no signalling frequency is transmitted.

Between these ranges (3) and (0) two further ranges (1) and (2) are defined by another threshold $S_2$. The corresponding signalling frequencies are $F_1$ and $F_2$.

If the voltage at terminal 11 lies in the range (0), this indicates that the transmission level in the associated transmitter-receiver is properly regulated for the optimum transmission level, and is not modified.

If the voltage at terminal 11 falls in one of the ranges (1), (2), or (3), this indicates that the transmission level of the associated transmitter-receiver must be reduced, by respectively 10 decibels (dB), 20 dB, or 30 dB, in the particular example under discussion. The transmitter section of the cooperating transmitter-receiver takes up the appropriate attenuation level in response to the reception of the corresponding signalling frequency. This process is more fully described in our above-mentioned co-pending patent application.

Evidently the use of four reception level ranges is given merely by way of example, and the number of thresholds may be changed for various applications to define the corresponding number of reception level ranges.

If the voltage at terminal 11 exceeds the highest threshold $S_0$, this indicates that the ratio of the signal to the overall signal, including the noise component, is too low. The transmission level is thus too low and the cooperating transmitter-receiver level returns to its maximum transmission level; a new regulation process then begins.

Figure 5:
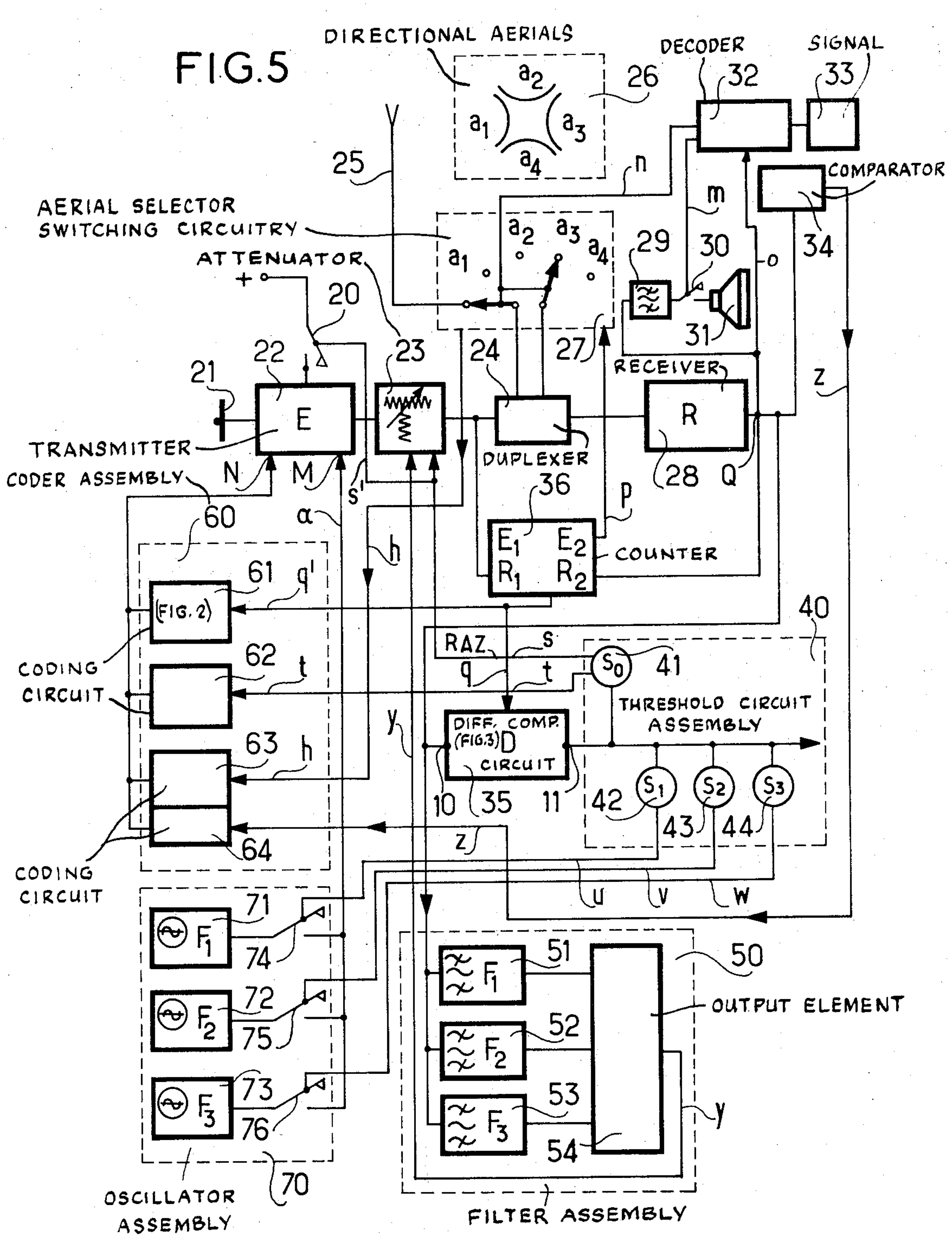
FIG. 5 is a block diagram of a radio transmitter-receiver.

Referring to FIG. 5, a transmitter-receiver is shown in the form of a block diagram, and includes both an omnidirectional aerial 25 and an assembly 26 of four directional aerials $a_1$, $a_2$, $a_3$, and $a_4$. In a simplified transmitter-receiver, of the type disclosed in the copending application the directional aerial assembly may be omitted, together with corresponding elements of the transmitter-receiver circuitry, as will be clear from the ensuing description.

The transmitter-receiver includes a transmitter proper 22, connected to receive voice frequency signals from a microphone 21. The transmitter 22 is only operational when a switch 20 is closed to connect it to its power source indicated by +. The transmitter output passes through a variable attentuator 23 to a duplexer 24 connected in turn to aerial selector switching circuitry 27.

The attenuation 23 may form an integral part of the transmitter 22, providing a regulation in the final stage for example, but the arrangement shown in FIG. 5 is equally applicable, particularly where the power transmitted does not exceed some few watts. The arrangement shown in FIG. 5 also leads to a simple connection applicable to a readily available transmitter.

The output of transmitter 22 is applied through the duplexer 24 and switching circuitry 27 either to the omnidirectional aerial 25 or one of the directional aerials of the assembly 26. The switching circuitry 27 is shown with two moving contacts since, at one stage of a regulation process, the transmitter-receiver broadcasts over a directional aerial while receiving on the omnidirectional aerial, or vice versa.

It will be appreciated that the switching circuitry 27 will consist of rapidly acting electronic circuitry of the type known in the art.

The duplexer 24 is also connected to the input of a receiver proper 28 whose demodulated output passes through a bandpass filter 29 and switch 30 to a loudspeaker or ear-piece 31. The passband of the filter 29 is the reduced frequency range $b_s$.

The output of the filter 29 is applied to one input of a de-coder 32 of the type which is known in the art and which can be constructed by one of ordinary skill in the art to de-code the selective calling code of the transmitter-receiver shown in the diagram as well as an omnibus code transmitted in response to the reception of a selective calling code in the called transmitter-receiver or after response to this response in the calling transmitter-receiver. The de-coder 32 is also arranged to decode a directive aerial code, as will be explained more fully below.

In response to the detection of the selective calling code of the transmitter-receiver shown in the diagram, the de-coder 32 activates signal device 33 for attracting the attention of the transmitter-receiver operator, simultaneously closing switch 30 over a line *m* to connect the loudspeaker 31 to receive a communication. The de-coder 32 responds to the detection of a directional aerial code by appropriately positioning one of the moving contacts of aerial switching circuitry 27 over line *n*.

The output of the receiver 28 is indicated Q in FIG. 5 and connected to this point Q is the input of a comparator 34 which includes a memory. It is arranged to identify the directional aerial of the cooperating transmitter-receiver giving the maximum reception level.

Also connected to the point Q is a differential comparator assembly 35 identical to the circuitry D shown in FIG. 3, with its input and output terminals 10 and 11, respectively.

A counter element 36 is arranged to count, at the beginning of the setting up of a communication, the first two transmission stages when calling or the first two reception stages when called. These two stages will be described in detail below. The counter element 36 contains a de-coding arrangement associated with a control arrangement for positioning over a line *p*, the selection of aerial 25 or an aerial of the assembly 26, over a line *q*, the positioning of the switching sections 12*a* to 12*d* of the differential comparator assembly 35, and over a line *q'*, part of a coder 60, to be described shortly.

As assembly 40 of threshold circuits as disclosed in the copending application includes four circuits 41 to 44, respectively, with respective threshold values $S_0$, $S_1$, $S_2$, and $S_3$, being those thresholds defined in FIG. 4. The input of the assembly 40 is connected to the output terminal 11 of the differential comparator assembly 35.

The threshold circuit 41 controls the variable attenuator 23 over a line *s* and the switch 20 over a line *s'*. Over a further line *t* the threshold circuit 41 controls a coder 62 of the coder assembly 60.

Respective output lines *u*, *v*, and *w* of threshold circuits 42, 43, and 44 are connected to the moving contacts of respective switches 74, 75, and 76 of an oscillator assembly 70. The assembly 70 contains three oscillators 71, 72, and 73, providing, respectively, the frequencies $F_1$, $F_2$, and $F_3$ defined in FIG. 1.

The fixed contacts of the switches 74, 75, and 76 are connected together and to an input M of the transmitter 22, over a line $\alpha$.

Also connected to point Q is a filter assembly 50 comprising three filters 51, 52, and 53 centered, respectively, on the frequencies $F_1$, $F_2$, and $F_3$. The filter outputs are connected to three respective inputs of an output element 54 whose output controls the variable attenuator 23 over a line *y* in dependence on which of the frequencies $F_1$, $F_2$, and $F_3$ is applied to it. By way of example, the element 54 may be arranged to select attenuations of respectively 10 dB, 20 dB, and 30 dB for the frequencies $F_1$, $F_2$, and $F_3$.

The coder assembly 60 comprises part of the coding circuitry of the transmitter 22 and has its output connected to an input N of that transmitter.

A first coder circuit 61 is the selective call code coder of FIG. 2. It can provide a coded calling pulse in one of the bands $b_i$, or in the bands $b_0$ or $b_e$.

Coding circuit 62 provides an omnibus code Z in band $b_0$ or in band $b_e$. The significance of this code will emerge later.

Coder circuit 63 provides a directional aerial code $a_1$, $a_2$, $a_3$, or $a_4$, signalling to the cooperating transmitter-receiver the directional aerial providing the maximal reception level, this information being decoded in the cooperating transmitter-receiver by means of its comparator 34. The coder circuit 63 is controlled by the switching circuitry 27 over a line *h*. This first directional aerial code is that for reception.

The coder circuit 64 provides a directional aerial code $a_1'$, $a_2'$, $a_3'$, or $a_4'$ significant of the directional aerial giving the maximum reception level. The coder circuit 64 is controlled by the comparator 34 over a line *z*.

Coder circuit 63 and 64 can provide codes in either band $b_0$ or band $b_e$.

Referring to FIGS. 6*a* and 6*b*, the process of setting up a communication and selecting and maintaining the optimum transmission levels is shown in a table divided into two parts for the sake of convenience. The table comprises a total of nine vertical columns referenced $C_1$ to $C_9$, column $C_5$ appearing both at the right-hand edge of FIG. 6*a* and the left-hand edge of FIG. 6*b*. In each column, the transmitter-receiver making a call is indicated A, while that receiving the call is indicated B. Furthermore, in each vertical column save the first column $C_1$, two sub-columns are headed R and E, corresponding respectively to reception (R) and transmission (E) in the corresponding transmitter-receiver. The first column $C_1$ includes only the transmission sub-column since the first step in the process is the transmission by transmitter-receiver A of the calling code of transmitter-receiver B. For convenience in the following description, the transmitter-receivers will be referred to as A and B only.

The table contains eleven horizontal rows or lines indicated $L_1$ to $L_{11}$ and having the following significations:

$L_1$ indicates the aerial in use, either the omnidirectional aerial indicated by the Greek letter Ω, or one of the directional aerials $a_1$ to $a_4$ of A, or one of the directional aerials $a_1'$ to $a_4'$ of B.

$L_2$ shows the aerial code transmitted by the respective transmitter-receiver and indicating memorizes directional aerial on which it is currently transmitting. The comparator for $L_3$ is used by the comparator 34. In A the comparator 34 memorizes the reception levels from the four directional aerials of B and is arranged to identify the aerial giving the strongest reception level in A. The aerial code of this aerial of B is then transmitted to B by A. When B receives this code, $a_2'$ for example, it adopts the aerial $a_2'$ for further transmission. The process in the opposite sense, carried out by the comparator 34 of B, is entirely analogous. If, for example, aerial $a_3$ of A provides the maximum reception level in B, on receiving the code $a_3$ from B, A retains the aerial $a_3$ for further transmission.

$L_4$ indicates a communication code passing between the two transmitter-receivers. This code contains two sets of information, either the selective calling code, here B, at the beginning of a communication, or the omnibus code Z in combination with one of the directional aerial codes.

$L_5$ indicates the frequency band in which the codes of line $L_4$ are transmitted. Here, for example, the code B is initially transmitted in band $b_2$ and the communication code, alternately $Z + a_3$ and $Z + a_2'$ is transmitted in a first band $b_0$ and subsequently band $b_e$ once the communication is established. The communication is established between columns $C_3$ and $C_4$, and is indicated by the vertical line M.

$L_6$ shows the speed of transmission in the bands indicated in line $L_5$. The change in transmission speed between columns $C_3$ and $C_4$ is carried out by appropriate and known circuitry in coders 61 to 64 which need not be described in detail here.

$L_7$ shows the indication provided by the counter element 36. Initially, this is set to zero, corresponding to position I of the switches in the assembly 35. After a single code transmission on all aerials, the element 36 marks up a first transmission, shown in the table as $E_1$. The switching sections of the assembly 35 respond by passing to their position II. After the first code transmission on the selected directional aerial, the element 36 marks up a second transmission, indicated in the table $E_2$. The switches of assembly 35 respond by passing to position III. Thus far, it is the element 36 of A which has been discussed.

As far as B is concerned, reception of the first code indicated $R_1$, causes the switches of assembly 35 to pass to position II. The end of the second communication received by B, marked up as $R_2$, passes the switches to position III. Simultaneously, and over line $q'$, the communication code is transferred from band $b_i$ to band $b_0$ and thence to band $b_e$. The change from omnidirectional aerial to the appropriate directional aerial is also carried out over line $p$.

$L_8$ shows the reception level range. In dependence on this range, transmission of the corresponding signalling frequency $F_1$, $F_2$, or $F_3$ is initiated over the respective one of the lines $u$, $v$, or $w$.

At the beginning of the process of setting up a communication, for example, when A lifts his handset, if B is available only the noise component appears in the differential comparator assembly 35 of A. The output voltage is then above threshold $S_0$, bringing about the connection of transmitter 22 by closing switch 20 over line $s'$. Initially, A and B transmit at their respective maximal levels $P_A$ and $P_B$. The initial reception levels are brought down eventually to the lowest level (0) by selective attenuation of the corresponding transmission level. Should the threshold $S_0$ again be exceeded, the assembly 40 inhibits transmission of the omnibus code Z by coder circuit 62. Since the associated transmitter-receiver no longer receives the code Z, it in turn ceases to transmit this code and the situation returns to the initial condition, A and B transmitting again at their maximal levels.

$L_9$ shows the signalling frequency transmitted, related to the reception level range of line $L_8$ as shown by the diagonal arrows. For range (0) no signalling frequency is transmitted.

$L_{10}$ shows the received signalling frequency, being evidently identical to the corresponding frequency of line $L_9$ as shown by the diagonal arrows.

$L_{11}$ shows the transmission level in each transmitter-receiver. Initially these are the maximal levels $P_A$ and $P_B$, being eventually regulated to $P_A - 30$ dB and $P_B - 20$ dB, respectively. The modification of the attenuation level in attenuator 23 is carried out by increasing the already existing level rather than by selecting a completely new level. The output element 54 of the assembly 50 memorizes the current attenuation level in the attenuator 23, and when the attenuation level must be changed provides only a signal corresponding to the required change. The signals are shown at the heads of the third set of diagonal arrows extending between lines $L_{10}$ and $L_{11}$. This process provides an optimal regulation in as short a time as possible. This output element 54 with its memory, of known type, is described in more detail in our above-mentioned co-pending patent application.

The table of FIGS. 6a and 6b shows the successive stages in the setting up of a communication and regulation of the transmission levels in a communication assuming the following initial parameters: transmission of the selective calling code for B in band $b_2$ by A.

Optimal directional aerial of A : $a_3$.
Optimal directional aerial of B : $a_2'$.
Initial reception level in B : (2).
Initial reception level for A : (1).

During the regulation process, each transmitter-receiver passes from a stage with reception on the omnidirectional aerial and transmission on a directive aerial to transmission and reception on the same directional aerial. In the passage from reception on the omnidirectional aerial to that on the directional aerial, it has been supposed in the table that the reception level in the cooperating transmitter-receiver passed to the next highest reception level range. An attenuation adjustment is thus necessary, consisting of an increase of 10 dB in the attenuation level.

Referring to FIG. 7, communications between two transmitter-receiver pairs are shown diagrammatically.

A transmitter-receiver G is transmitting to transmitter-receiver K and has a transmission lobe 81. A transmitter-receiver W transmits to a transmitter-receiver Y with transmission lobe 83.

The transmission lobes 81 and 83 result from the selection of the most favorable directional aerial and the regulation of the transmission level to its optimum value, as described above with regard to the operation of the arrangement of FIG. 5. It is seen that the lobes 81 and 83 do not intersect, so that there is no interference between the two transmissions, the transmission lobe of transmitter-receiver G not reaching transmitter-receiver Y, and that of transmitter-receiver W not reaching transmitter-receiver K. Similarly, although not shown in the diagram for the sake of simplicity, the transmission lobes of transmitter-receivers K and Y to transmitter-receivers G and W, respectively, will be similarly adjusted to provide no interference. The lobe pattern for the directional aerials is provided in the manner known in the art with the adjustment thereof being effected as indicated above.

It will be appreciated that with the transmission lobes regulated in this way, the same carrier frequency can be used for both communications without risk of mutual interruption.

If the aerial selection and level optimisation had not been carried out, the transmission lobes would be as indicated in dotted outline at 82 and 84, and it is seen that the transmission lobe 82 of transmitter-receiver G reaches transmitter-receiver Y, while that of transmitter-receiver W reaches transmitter-receiver K. The two communications would thus interfere with each other if the same carrier frequency were used.

Where one communication, G-K for example, is set up before the other, it will be subject to slight interference from the other W-Y while the latter is being set up and regulated, but this interference will not in general last more than one hundred milliseconds. Moreover, the receivers of transmitter-receivers G and K at this time are in communication on the narrow frequency band so that there is no risk of the liaison GK being interrupted.

The space occupied by the transmitter-receivers is thus divided up into tubes corresponding to the transmission lobes, allowing multiple traffic inside each tube without interference between tubes.

The use of a transmitter-receiver such as just described has a number of advantages. The coding, decoding and extraction of all the necessary data for the regulation process is carried out in the low frequency or vocal frequency band. No modification is necessary to the high frequency or intermediate frequency circuits of the transmitter-receivers. The invention may thus be used with existing transmitter-receivers. To the transmitter 22 and receiver 28 may easily be added all the remaining circuitry, totality being mounted in a single casing of small volume. The only exceptions to this are the attenuator 23, which may be easily connected between the transmitter and the aerial duplexer, and the aerial switching circuitry 27, which must be connected to the duplexer output.

The sub-division of the low frequency band provides both an acceleration of the selective call code transmission, in reducing the length of the codes, and also provides a service channel which, simultaneously with high-speed communication between transmitter-receivers, permits the relatively slow exchange of the communication codes. The differential comparison between the coding signal in band $b_i$ or $b_e$ and the overall signal, including the noise component, in bands $b_i$ or $b_0$, respectively, of ten times the bandwidth, provides by simple means data on the availability of the called subscriber as well as the reception level, from which latter stems the automatic regulation of the transmission level to an optimum value.

In the case of transmission-receivers with directional aerials, it is possible to select that aerial providing the most favorable conditions for communication. In this, most complex mode of operation, the totality of the regulation processes will not last more than some tenths of a second.

If the transmission level in one of a pair of cooperating transmitter-receivers becomes too low, the regulation re-starts from scratch with initial transmission from both transmitter-receivers at the maximal level.

By using an optimal transmission level and a selected directional aerial for optimum transmission conditions, it is possible to provide several communications on a common carrier frequency within a transmission-receiver network.

What is claimed is:

1. A radio transmitter-receiver for operation in one of $k$ individual vocal frequency bands in an overall frequency range made up of $k + 1$ frequency bands, comprising

- a transmitter section for transmitting both communication and control signals,
- a receiver section for receiving signals from another transmitter-receiver,
- antenna means selectively connectable to said transmitter section and said receiver section, and
- call coder means for generating a pulsed code of $n$ digits for modulation in one of said $k$ individual vocal frequency bands, whereby a total of $2^n k$ pulsed codes are available as the output of said call coder means, said call coder means being connected to said transmitter section for supplying the pulsed code thereto for transmission by said transmitter section.

2. A radio transmitter-receiver as defined in claim 1, wherein said overall frequency range is made up of $k$ individual vocal frequency bands and a common frequency band, said call coder means including secondary coder means for generating a communication code in the common frequency band.

3. A radio transmitter-receiver as defined in claim 2, wherein said antenna means includes an omnidirectional antenna and a plurality of directional antennas and antenna selector switching means for connecting selected ones of said antennas to said transmitter section and said receiver section, said call coder means further including tertiary coder means responsive to said antenna selector switching means for generating in said common frequency band, generated by said secondary coder means, respective antenna codes significant of each directional antenna for transmission by said transmitter section.

4. A radio transmitter-receiver as defined in claim 3, wherein said common frequency band includes a narrow frequency band in which said communication code and said antenna codes are transmitted at a transmission speed lower than that at which the remainder of said common bands and said individual bands operate.

5. A radio transmitter-receiver as defined in claim 4, wherein the ratio of the widths of said narrow frequency band and said common frequency band is substantially equal to the ratio of the widths of said common frequency band and said overall frequency range.

6. A radio transmitter-receiver as defined in claim 5, further including level detecting means connected to the output of said transmitter section for generating a first coded signal indicative of the level of the output of said receiver section.

7. A radio transmitter-receiver as defined in claim 6, wherein said level detecting means includes first through fourth filter circuits for passing said overall frequency range, one individual frequency band, said common frequency band and said narrow frequency band, respectively, a pair of demodulators, a comparator circuit connected to compare the outputs from said demodulators, and switching circuitry for selectively connecting inputs of selected pairs of said first through fourth filter circuits to the output of said receiver section and outputs of the selected filter circuit pairs to inputs of said demodulators, said comparator circuit output providing an indication of the reception level in the receiver section.

8. A radio transmitter-receiver as defined in claim 7, wherein said level detecting means further includes counter means for counting the initially received communications and the initial transmissions, said switching circuitry being responsive to said counter means to connect three pairs of filter circuits sequentially between said receiver section and said demodulators to obtain comparisons respectively of (*a*) the individual frequency band and the overall frequency range, (*b*) the common frequency band and the overall frequency range, and (*c*) the narrow frequency band and the common frequency band.

9. A radio transmitter-receiver as defined in claim 7, wherein said level detecting means further includes threshold circuit means connected to the output of said comparator circuit for providing different threshold signals defining respective level ranges, said threshold circuit means being adapted to produce a unidriectional voltage in the lowest level range in response to said comparator circuit indicating a reception level in a predetermined minimum range.

10. A radio transmitter-receiver as defined in claim 9, wherein said level detecting means further includes level signalling means for selecting one of a plurality of signalling frequencies outside said overall range of frequencies for transmission by said transmitter section in response to the level indicated by the threshold signal received from said threshold circuit means.

11. A radio transmitter-receiver as defined in claim 10, further including level section means for attenuating the output from said transmitter section in response to receipt of a first coded signal through said receiver section from another radio transmitter-receiver.

12. A radio transmitter-receiver as defined in claim 3, further including detection means responsive to the receipt of antenna codes through said receiver section from another transmitter-receiver for detecting the strongest received antenna code.

13. A radio transmitter-receiver as defined in claim 12, wherein said call coder means further includes additional coder means for generating an antenna identifying signal applied to said transmitter section indicating the strongest received antenna code as detected by said detection means.

14. A radio transmitter-receiver as defined in claim 13, further including antenna selection means responsive to receipt of an antenna identifying signal at the output of said receiver section for actuating said antenna selector switching means to connect said transmitter section to a specific one of said directional antennas.

15. A radio transmitter-receiver as defined in claim 14, further including level selection means for attenuating the output from said transmitter section in response to receipt of a first coded signal through said receiver section from another radio transmitter-receiver.

16. A radio transmitter-receiver as defined in claim 15, further including level detecting means connected to the output of said transmitter section for generating a first coded signal indicative of the level of the output of said receiver section.

17. A radio transmitter-receiver as defined in claim 3, further including antenna selection means responsive to receipt of an antenna identifying signal at the output of said receiver section for actuating said antenna selector switching means to connect said transmitter section to a specific one of said directional antennas.

18. A radio transmitter-receiver as defined in claim 1, wherein said call coder means includes means for modulating one of said *k* individual vocal frequency bands with said generated pulsed code.

* * * * *